June 20, 1967  R. BRUSCAGLIONI  3,325,901
PROCESS FOR ELIMINATING ERRORS OF ECCENTRICITY AND FOR REDUCING
ERRORS OF GRADUATION IN TOPOGRAPHIC INSTRUMENTS
Filed July 9, 1963
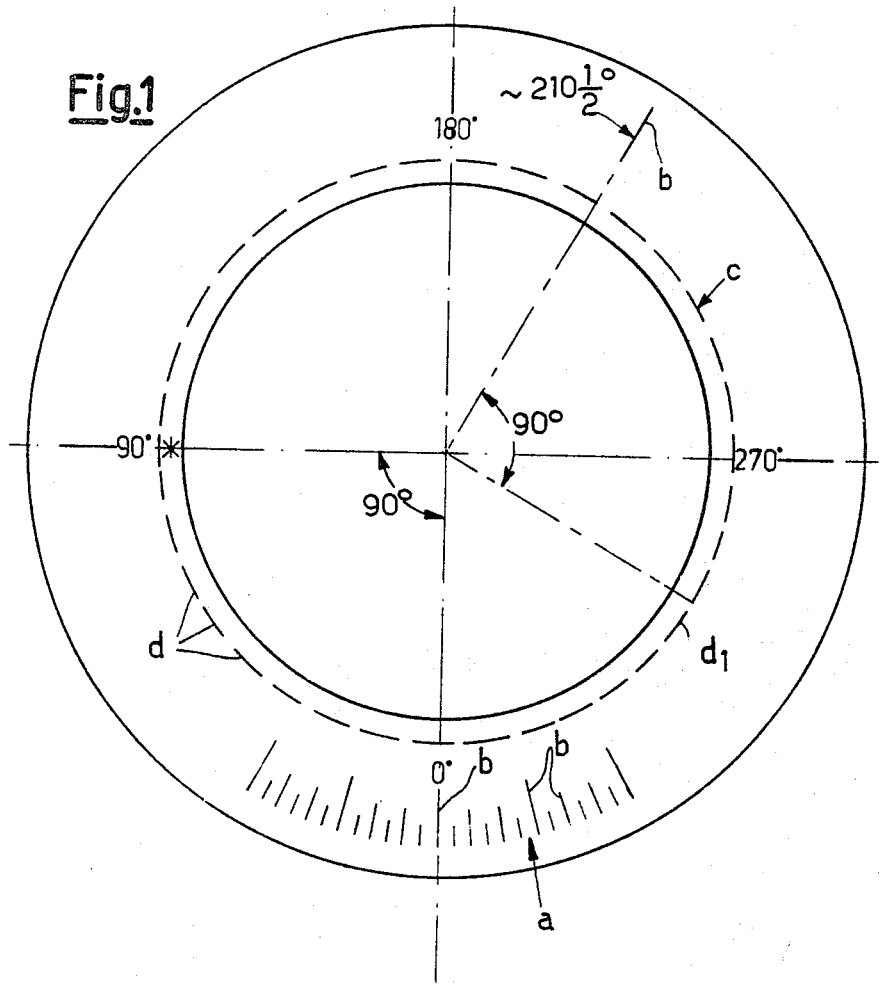
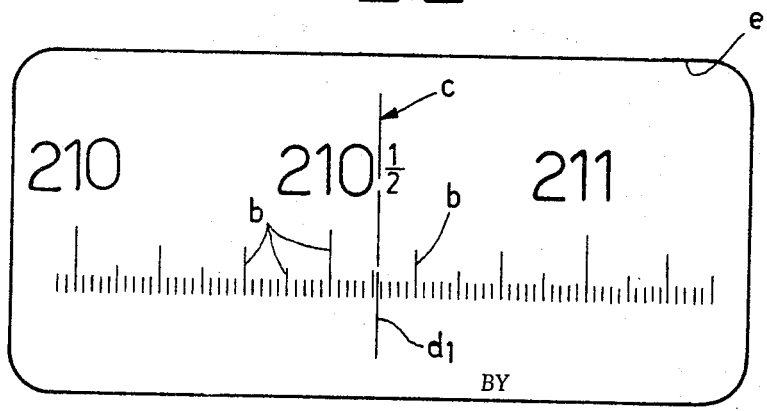

United States Patent Office 3,325,901
Patented June 20, 1967

3,325,901
PROCESS FOR ELIMINATING ERRORS OF ECCENTRICITY AND FOR REDUCING ERRORS OF GRADUATION IN TOPOGRAPHIC INSTRUMENTS
Raffaello Bruscaglioni, Milan, Italy, assignor to Filotecnica Salmoiraghi S.p.A., Milan, Italy, a company of Italy
Filed July 9, 1963, Ser. No. 293,660
Claims priority, application Italy, July 13, 1962, 671,816
5 Claims. (Cl. 33—1)

This invention relates generally to topographic instruments of the type for measuring angles between sighted points.

It is well known that, in all topographic instruments adapted for the measuring of angles and which are for that purpose provided with a scale or graduations arranged along a circle, there exists an inevitable mechanical eccentricity between such circle and the corresponding axis of rotation.

That eccentricity, which can be reduced to minimal values but obviously never can be eliminated completely, causes the value read on the graduated circle of a certain angle between two marked points not to be the actual value of the angle existing between said points. The difference between the value read and the true value of the angle is a function of the eccentricty existing between the center of the graduation circle and the axis of rotation of the instrument.

It is also known that the error resulting from such eccentricity can be eliminated by taking, as the true value of the angle between the marked or sighted points, the arithmetical means of two readings of the angle between the sighted points made portions of the graduated circle that are diametrically opposed or at 180° with respect to each other.

This procedure can be followed by means of readings effected in two microscopes at 180° from each other as well as with a single microscope in which two diametrically opposed portions of the graduated circle simultaneously appear in the field of view; or even automatically, assuming as a reference or index for the reading of a graduation along the circle, the graduation which is diametrically opposed thereto and which is made to appear optically in the field of view of the same microscope reading the first graduation. A second procedure for eliminating the error due to eccentricity consists in optically viewing, by a single microscope, the image of the graduation of the circle as well as that of an auxiliary circle or reference index which may serve as a lubber line and is traced on the instrument concentric with the graduated circle. According to this latter procedure, the two images of the graduation and of a portion of the reference circle taken at 90° from each other are optically superimposed in such a manner that the portion of the reference circle observed at a certain instant contemporaneously with a portion of the graduated circle acts as a reference for the reading of graduations of the latter and is assimilable in practice to a section of straight line, owing to its smallness and to the magnification with which it is seen.

Under these conditions the indication of the graduation with reference to the portion of the reference circle that appears to intersect it provides an angular value automatically exempt from errors of eccentricity since the latter influences the graduation and the corresponding portion of the reference circle by identical and self-compensating displacements. This method, which is very simple and rapid in concept, has however never found any application in practice owing to difficulties of construction.

Accordingly, it is an object of the present invention to provide a process for producing the graduated circle as well as the index or reference circle while avoiding the difficulties, inconveniences and errors that previously prevented application in practical topographic instruments of the last mentioned procedure for eliminating errors in angular readings due to eccentricity.

The process according to the invention, which eliminates those errors and inconveniences, is essentially characterized in that contemporaneously with the making of a portion of the graduated circle of the instrument, and concentrically with said graduated, there is made with a phase difference of a constant predetermined angle such as for instance 90° with respect to said portion, an elementary small arc of the index or reference circle, so that the same possible systematic and accidental errors equally influence each portion of the graduated circle and the corresponding portion of the index circle at a predetermined angle or phase difference with respect thereto. Hereinafter, each portion of the graduated circle and the corresponding portions of the index or reference circle are together referred to as a "reading couple." The angle between each reading couple may be of a different value than 90°, provided it is a fixed value.

In the practical embodiment of the process according to the invention, the tooling for the making of the graduated circle has applied thereto a kinematic chain of any kind in such a way that contemporaneously and concentrically with each portion of the graduated circle, and at 90° with respect thereto, there is made at the desired distance from the center a small arc of the index or reference circle.

The subsequent making of the various graduations, therefore, leads to the subsequent making of the various small arcs of the index or reference circle which upon a complete revolution of the indexing machine, form the entire reference circle.

By this process, every graduation or portion of the graduated circle remains tied up to a determined small arc of the reference circle and since the one and the other are made at the same instant and under the same conditions, they undergo the same systematic and accidental errors of value as well as of sign.

In other words the inevitable errors affecting the graduation, are accurately equal to the errors affecting the reference or index circle, but with a predetermined difference of phase.

The invention will be more fully set forth with reference to the figures of the accompanying drawing, wherein:

FIG. 1 is a plan top view of the dial of an instrument having an angle-reading graduated circle and the respective index or reference circle, and FIG. 2 shows portions of the graduated circle and of an index or reference circle, as visible in the field of the microscope.

With reference to FIG. 1, by $a$ is indicated the graduated circle or scale as a whole and by $b$ are indicated the individual graduations thereof. The index or reference circle is indicated generally by $c$ and by $d$ each constituent portion or small arc thereof. According to the invention, with the aid of a kinematic chain of any kind (gear trains, transmissions, drives and the like) applied to the indexing machine with which the graduations $b$ are produced, contemporaneously with every graduation $b$ that is traced on the dial by the machine there is also traced a corresponding small arc $d$ but at a constant or predetermined angular displacement with respect to the graduation, preferably but not necessarily an angular displacement of 90°.

Hence for instance, when the graduation $b$ corresponding to 0° is traced, the predetermined angle being 90°, there will be also traced at the same time the small arc $d$ of the reference circle that in FIGURE 1 is marked by an asterisk (*) and that finds itself precisely at 90° with respect to the graduation $b$ indicating 0°. In the field $e$ (see FIG. 2) of the microscope (not shown) there will therefore appear, in register with the reading of 0°, the small arc $d$ of the reference circle $c$ marked by an asterisk (*) and such small arc $d$ will appear in the field $e$ substantially as a straight line by reason of the optical magnification.

According to the invention, the instrument is adjusted so that initially the graduation $b$ corresponding to 0° corresponds in the field $e$ with the small arc $d$ marked by (*) (and which is out of phase therewith by 90°); thus it will be certain that any other graduation $b$ (of an angle to be read) will be read with the corresponding small arc $d$, also equally out of phase. In other words, if one reads the value of an angle by observing in the field $e$ the graduation $b$ of the graduated circle that appears to be intercepted by a portion $d$ of the index circle, said reading is effected with that elementary small arc $d_1$ of the index or reference circle that has been traced contemporaneously with the tracing of the graduation $b$ that is being read. If the tracing was effected with a certain error, this error influenced at that time the graduated circle as well as the index or reference circle (with the predetermined phase difference), and the error now influences in the same way the two elements of the reading and has no importance so that the reading appears to be accurate.

By marking in any manner the small arc of the index or reference circle contemporaneously with a predetermined portion of the graduated circle, there is constituted a reading couple which, at the time of assembling the instrument and during the angular positioning of the reading means, permit the accurate reproduction of the conditions at the time when they were made.

Each graduation is automatically and biunivocally coupled with the coresponding small arc of the index circle and the reference for the reading of the angular values on the graduated circle, in each of the different zones thereof, is represented by the small arc of the index circle that has been made contemporaneously with the zone of graduation examined.

Said coupling, in the manufacturing stage and in the reading stage, eliminates the influence of the errors of manufacture upon the accuracy of reading.

It should be pointed out that on having established a certain pitch of the indexing machine which turns the instrument during the tracing of the graduated circle and the index circle, the elementary arc of the index circle formed contemporaneously with each corresponding graduation may be in the form of a point or dot or have a perceptible circumferential dimension which is smaller, equal or larger than the pitch of the indexing machine.

In the case of points or dots, the index circle will be represented by a discontinuous line of points which is not suited, owing to the discontinuities, to act as a lubber line.

In the case of arcs $d$ of index circle $c$ having circumferential dimensions that are equal to, or larger than the pitch of the indexing machine, the index circle will appear as a curve-lined polygon, which also is not suited to act as a lubber line owing to the inevitable inaccuracies of closure and superimposition of the sides.

If on the contrary the elementary small arcs $d$ are given a length a little smaller than the pitch of the indexing machine (e.g. $9/10$) the index circle will be formed by a dashed-line with much smaller and relatively widely spaced discontinuities, so as not to disturb the continuity of the lubber line and consequently the safety of reading, whether the interruption during reading falls within the graduation or outside the latter. For instance, in FIG. 2 is indicated the reading of an angle of about 210½° and such reading is done with the corresponding elementary arc $d_1$ (FIG. 1) of the index circle $c$ that was traced contemporaneously with the graduation $b$ corresponding to said angle.

I claim:
1. A process for eliminating errors due to eccentricity and for reducing errors of graduation in the reading of angles by the optical system of a topographic instrument, comprising the steps of turning at least a portion of said instrument which is to bear an angle reading scale, during the turning of said portion of the instrument applying graduations successively thereto in the form of a circle to constitute said scale, and contemporaneously with the application of each of said graduations to said portion of the instrument also applying thereto a corresponding arc of an index circle which is concentric with said circle of the graduations, said arc applied contemporaneously with each of said graduations being at a predetermined angle with respect to the corresponding graduation so as to be simultaneously visible in the field of the optical system and form a reading couple with the graduation, so that any errors with respect to each reading couple equally affect the graduation and corresponding arc of the index circle forming said reading couple, but with a phase difference therebetween equivalent to said predetermined angle.

2. The process as in claim 1, wherein said predetermined angle is 90°.

3. The process as in claim 1, further comprising marking on said index circle which of the arcs thereof corresponds to a reference graduation of said circle of graduations so as to constitute a basic reading couple with the latter.

4. The process as in claim 3; wherein the arc of said index circle which is marked is disposed at said predetermined angle with respect to the graduation representing 0°.

5. The process as in claim 3, in which the optical system of the instrument is initially adjusted to collimate said reference graduation and the corresponding arc constituting said basic reading couple in the field of the optical system.

References Cited

UNITED STATES PATENTS

| 329,139 | 10/1885 | Clark | 33—1 |
| 1,274,293 | 7/1918 | Little | 33—1 |
| 1,699,619 | 1/1929 | Muench | 33—1 |
| 2,619,002 | 11/1952 | Baker | 33—1 |
| 3,096,444 | 7/1963 | Seward | 33—1 |
| 3,202,129 | 8/1965 | Weldon | 116—135 |

FOREIGN PATENTS

| 889,251 | 9/1943 | France. |
| 825,172 | 12/1951 | Germany. |

LEONARD FORMAN, *Primary Examiner.*

LOUIS J. CAPOZI, *Examiner.*